United States Patent
Honda et al.

(10) Patent No.: US 12,007,298 B2
(45) Date of Patent: Jun. 11, 2024

(54) FIBER OPTIC TEST METHODS, FIBER OPTIC TEST EQUIPMENT, AND PROGRAMS

(71) Applicant: NIPPON TELEGRAPH AND TELEPHONE CORPORATION, Tokyo (JP)

(72) Inventors: Nazuki Honda, Musashino (JP); Kazutaka Noto, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 271 days.

(21) Appl. No.: 17/636,093

(22) PCT Filed: Aug. 23, 2019

(86) PCT No.: PCT/JP2019/033141
§ 371 (c)(1),
(2) Date: Feb. 17, 2022

(87) PCT Pub. No.: WO2021/038648
PCT Pub. Date: Mar. 4, 2021

(65) Prior Publication Data
US 2022/0299401 A1  Sep. 22, 2022

(51) Int. Cl.
G01M 11/00 (2006.01)
G01M 11/02 (2006.01)
H04B 10/071 (2013.01)

(52) U.S. Cl.
CPC .... *G01M 11/3145* (2013.01); *G01M 11/0242* (2013.01); *G01M 11/3163* (2013.01); *H04B 10/071* (2013.01)

(58) Field of Classification Search
CPC .. G01M 11/30; G01M 11/31; G01M 11/3109; G01M 11/3118; G01M 11/3127;
(Continued)

(56) References Cited

U.S. PATENT DOCUMENTS 5,129,721 A * 7/1992 Sakamoto .......... G01M 11/3145
356/73.1
5,131,743 A * 7/1992 Kaneko .............. G01M 11/3145
356/73.1
(Continued)

FOREIGN PATENT DOCUMENTS

JP   H05215637 A   8/1993
JP   H0719996 A    1/1995
(Continued)

*Primary Examiner* — Gordon J Stock, Jr.
(74) *Attorney, Agent, or Firm* — Harness, Dickey & Pierce, P.L.C.

(57) ABSTRACT

An object of the present invention is to provide an optical fiber test method, an optical fiber test apparatus, and a program, capable of detecting a boundary of an optical fiber line facility regardless of a change in a noise amount. A change amount (a differential value) of an OTDR waveform increases toward a distal end due to noise effects, making it difficult to determine a boundary of the optical fiber using the change amount. Therefore, in the present invention, a dispersion of the OTDR waveform, which increases toward a distal end due to noise effects, is also used to determine the boundary of the optical fiber. In other words, in the present invention, the noise amount is expressed by the dispersion, and the dispersion is compared with the change amount such as a differential value as a threshold, to determine the boundary of the optical fiber. For this reason, when noise increases, the threshold increases together with an increase in the change amount, and therefore, the boundary of the optical fiber can be determined regardless of noise.

7 Claims, 6 Drawing Sheets

1 OPTICAL FIBER CABLE
2 OTDR
3 FUSION CONNECTION POINT

(58) Field of Classification Search
CPC ......... G01M 11/3136; G01M 11/3145; G01M 11/3154; G01M 11/316; G01M 11/0242; G01M 11/3163; H04B 10/071
USPC ....................................................... 356/73.1
See application file for complete search history.

(56) References Cited

U.S. PATENT DOCUMENTS

| | | | |
|---|---|---|---|
| 5,155,439 A * | 10/1992 | Holmbo | G01M 11/3145 324/534 |
| 5,365,328 A | 11/1994 | Anderson | |
| 5,652,715 A * | 7/1997 | Hanson | G01M 11/3145 356/73.1 |
| 5,731,869 A | 3/1998 | Minami | |
| 5,933,227 A * | 8/1999 | Furuhashi | H04B 10/071 356/73.1 |
| 6,011,615 A * | 1/2000 | Mamyshev | G02B 6/02247 356/73.1 |
| 7,102,739 B2 * | 9/2006 | Endo | G01M 11/3145 356/73.1 |
| 9,948,385 B2 * | 4/2018 | Yi | H04B 10/0791 |
| 11,483,067 B2 * | 10/2022 | Matsumoto | H04B 10/40 |

FOREIGN PATENT DOCUMENTS

| | | | |
|---|---|---|---|
| JP | H0918428 A | 1/1997 | |
| JP | 3282753 B2 | 5/2002 | |

* cited by examiner

FIBER OPTIC TEST METHODS, FIBER OPTIC TEST EQUIPMENT, AND PROGRAMS

CROSS-REFERENCE TO RELATED APPLICATIONS

This application is a 371 U.S. National Phase of International Application No. PCT/JP2019/033141, filed on Aug. 23, 2019. The entire disclosure of the above application is incorporated herein by reference.

TECHNICAL FIELD

The present disclosure relates to an optical fiber test method, an optical fiber test apparatus, and a program for analyzing optical fiber line characteristics.

BACKGROUND ART

As a method for measuring loss and the like as optical fiber line characteristics, for example, a light pulse test (optical time domain reflectometer (OTDR)) is known. In order to analyze light pulse waveforms, where a fiber optic line is delimited (where the optical fiber line has a connection point) is very important information. For example, Patent Literature 1 discloses that, to automatically analyze optical line characteristics, the characteristics are determined by a change in a slope for each section.

PTL 1 describes that a differential value is dY/dX when a distance of the light pulse waveform is X, and a loss is Y, and section identification (identification of a connection point) is performed using a change of the sign from 0 to negative as an index.

CITATION LIST

Patent Literature

PTL 1: JP 3282753 B

SUMMARY OF THE INVENTION

Technical Problem

However, in the actual light pulse waveform, noise is superimposed on a signal measured by a reception unit that receives a scattered light signal. In addition, when an optical power distribution in a longitudinal direction is plotted by light pulse measurement, an optical fiber transmission loss and a connection loss are integrated and the optical power decreases, so that noise is superimposed toward a distal end. In other words, a differential value does not simply vary from 0 to negative, and a noise amount gradually increases at the distal end portion with respect to a proximal end portion, and thus, the prior art has a problem that it is difficult to detect the connection point at a simple differential value or a threshold.

In order to solve the problem described above, an object of the present invention is to provide an optical fiber test method, an optical fiber test apparatus, and a program, capable of detecting a boundary of an optical fiber line facility regardless of a change in a noise amount.

Means for Solving the Problem

In order to achieve the object described above, an optical fiber test method according to the present invention acquires return light intensity (an OTDR waveform) with respect to time from return light of a light pulse emitted to an optical fiber, and detects an equipment boundary (a connection point of the optical fiber) from a relationship between a change amount and randomness of the OTDR waveform.

Specifically, the optical fiber test method of the present invention includes:
emitting a light pulse to one end of an optical fiber to be tested;
receiving backscattered light generated by the light pulse;
acquiring a light pulse test waveform of a light intensity of the backscattered light relative to a distance from the one end of the optical fiber to be tested;
calculating a value of a change amount and a randomness value of the light pulse test waveform at a plurality of points, in a longitudinal direction, of the optical fiber to be tested;
comparing the change amount and the randomness value at particular points among the points; and
determining, among the particular points, a point where the change amount is greater than the randomness value to a boundary point present in the optical fiber to be tested.

In addition, an optical fiber test apparatus according to the present invention includes: a light incidence part that emits a light pulse to one end of an optical fiber to be tested; a light reception part that receives backscattered light generated by the light pulse; and an analysis unit that acquires a light pulse test waveform of light intensity of the backscattered light relative to a distance from the one end of the optical fiber to be tested, calculates a value of the change amount and a randomness value of the light pulse test waveform at points, in a longitudinal direction, of the optical fiber to be tested, compares the change amount and the randomness value at particular points among the points, and determines, among the particular points, a point where the change amount is greater than the randomness value to a boundary point present in the optical fiber to be tested.

As described above, the change amount (differential value) of the OTDR waveform increases toward the distal end due to noise effects, making it difficult to determine the boundary of the optical fiber using the change amount. Here, in the present invention, the dispersion of the OTDR waveform, which increases toward the distal end due to noise effects, is also used to determine the boundary of the optical fiber. In other words, in the present invention, the noise amount is expressed as the dispersion, and the dispersion is compared with the change amount such as a differential value, as a threshold, to determine the boundary of the optical fiber. For this reason, when noise increases, the threshold increases together with an increase in the change amount, and therefore the boundary of the optical fiber can be determined regardless of noise.

Accordingly, the present invention can provide an optical fiber test method and an optical fiber test apparatus capable of detecting a boundary of an optical fiber line facility regardless of a change in the noise amount.

The present invention is characterized in that, among the points, a point at which the change amount is greater than a predetermined threshold is defined as the particular point.

In the present invention, the randomness is a dispersion of the light pulse test waveform in a section 1 from the particular point to the one end side. However, the section 1 is a value obtained by dividing a product of the speed of light c in a vacuum and a width w of the light pulse by a refractive index n of a core of the optical fiber to be tested.

The present invention provides a program for causing a computer to function as the analysis unit provided in the optical fiber test apparatus. The optical fiber test apparatus according to the present invention can also be implemented by a computer and a program, and the program may be recorded in a recording medium or provided through a network.

Note that each of the inventions described above can be combined with each other to the extent possible.

Effects of the Invention

The present invention can provide an optical fiber test method, an optical fiber test apparatus, and a program, capable of detecting a boundary of an optical fiber line facility regardless of a change in a noise amount.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings indicate the same components.

First Embodiment

Figure 1:
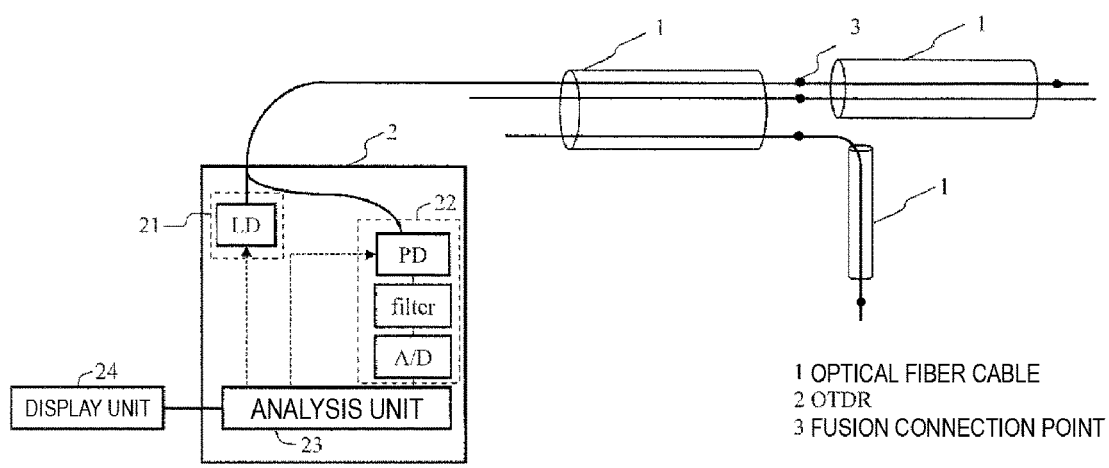
FIG. 1 is a diagram for explaining an optical fiber test apparatus according to the present invention.

FIG. 1 is a diagram illustrating an optical pulse test apparatus (OTDR) 2 according to the present embodiment. The OTDR 2 includes:
 a light incidence part 21 that emits a light pulse to one end of an optical fiber to be tested 1;
 a light reception part 22 that receives backscattered light generated by the light pulse; and an analysis unit 23 that acquires a light pulse test waveform with a light intensity of the backscattered light relative to a distance from the one end of the optical fiber to be tested 1, calculates a change amount and a randomness value of the light pulse test waveform at each point, in a longitudinal direction, of the optical fiber to be tested 1; compares the change amount and the randomness value at particular points among the points, and determines a point where the change amount is greater than the randomness value among the particular points to a boundary point present in the optical fiber to be tested 1.

The light incidence part 21 has a laser diode (LD) and outputs a light pulse in accordance with an instruction from the analysis unit 23.

The light reception part 22 has a photodiode (PD) that receives the backscattered light and converts the backscattered light into an electrical signal, a band-pass filter, and an AD converter that converts the electrical signal into a digital signal.

Further, the OTDR 2 may include a display unit 24 that displays the results analyzed by the analysis unit 23.

The optical fiber to be tested 1 is, for example, an optical fiber line connecting a plurality of optical fiber cables in a column and connecting desired points each other. The cables are connected by connectors or fusion bonding (a fusion point 3). Because there is a slight gap on an end surface of the optical fiber in the connector connection, Fresnel reflection with a reflection attenuation of approximately 20 to 50 dB occurs. On the other hand, fusion bonding does not cause such reflection, and it is difficult to detect the fusion point 3 in a normal OTDR. The OTDR 2 can detect the fusion point 3 even in an optical fiber line connected by fusion bonding.

Figure 3:
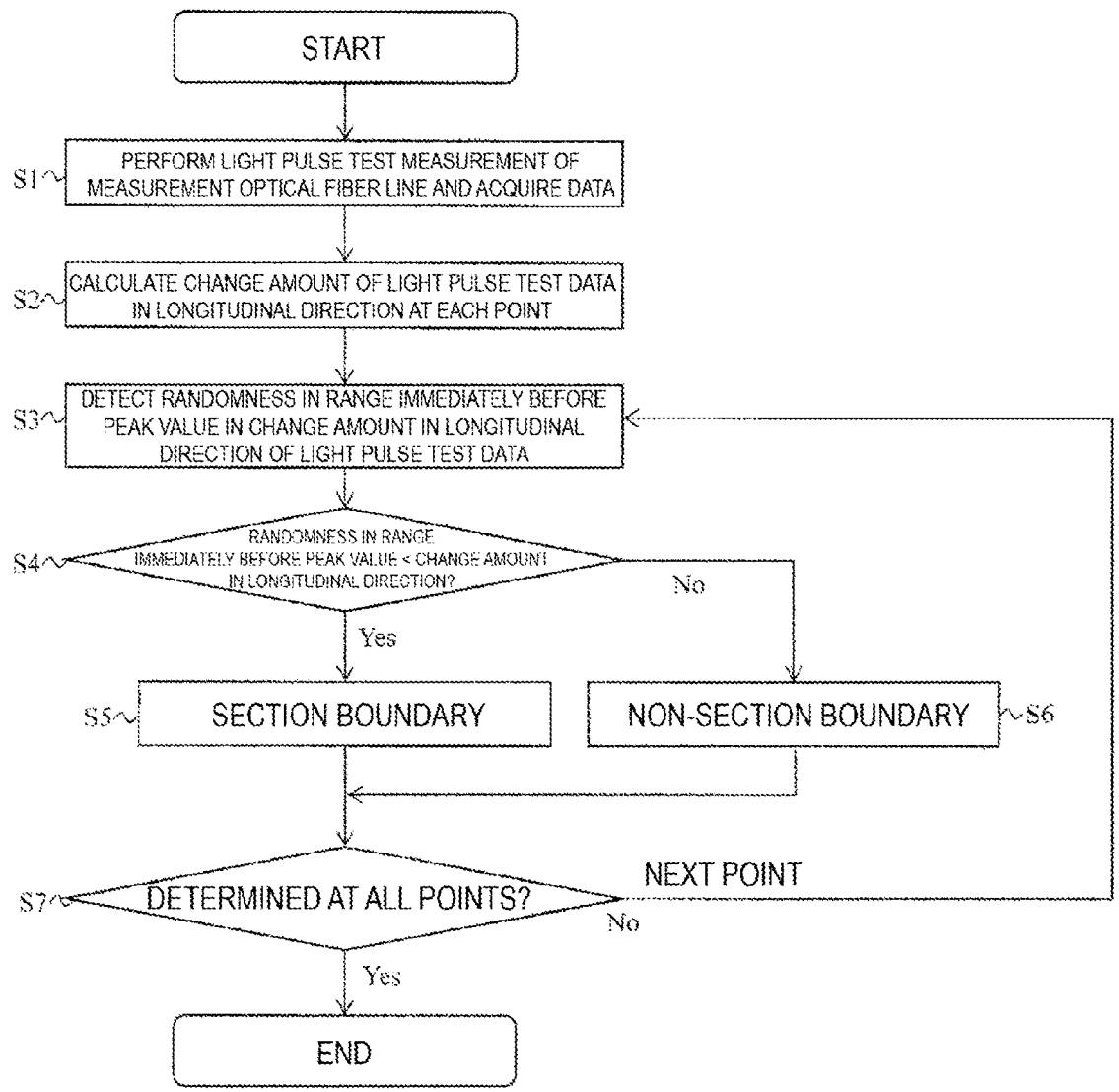
FIG. 3 is a flowchart for explaining an optical fiber test method according to the present invention.

FIG. 3 is a flowchart for explaining operations of the analysis unit 23 of the OTDR 2. First, the analysis unit 23 performs a light pulse test measurement of the optical fiber to be tested 1 and acquires data (an OTDR waveform) (step S1). Next, the analysis unit 23 calculates a change amount of the OTDR waveform in a longitudinal direction (step S2). Next, the analysis unit 23 detects a peak position in the change amount of the OTDR waveform in the longitudinal direction, and detects the randomness in a range immediately before the peak position (step S3). Next, the analysis unit 23 compares the randomness value in the range immediately before the peak position and the change amount in the longitudinal direction at the peak position (step S4). If the change amount in the longitudinal direction is larger than the randomness value, the analysis unit 23 determines that the peak position is a section boundary (a connection point 3) (step S5). On the other hand, if the randomness value is larger than the change amount, the analysis unit 23 determines that the peak position is caused by noise and is not the section boundary (the connection point 3) (step S6). Steps S3 to S7 are performed for the next peak position (step S7).

Figure 2:
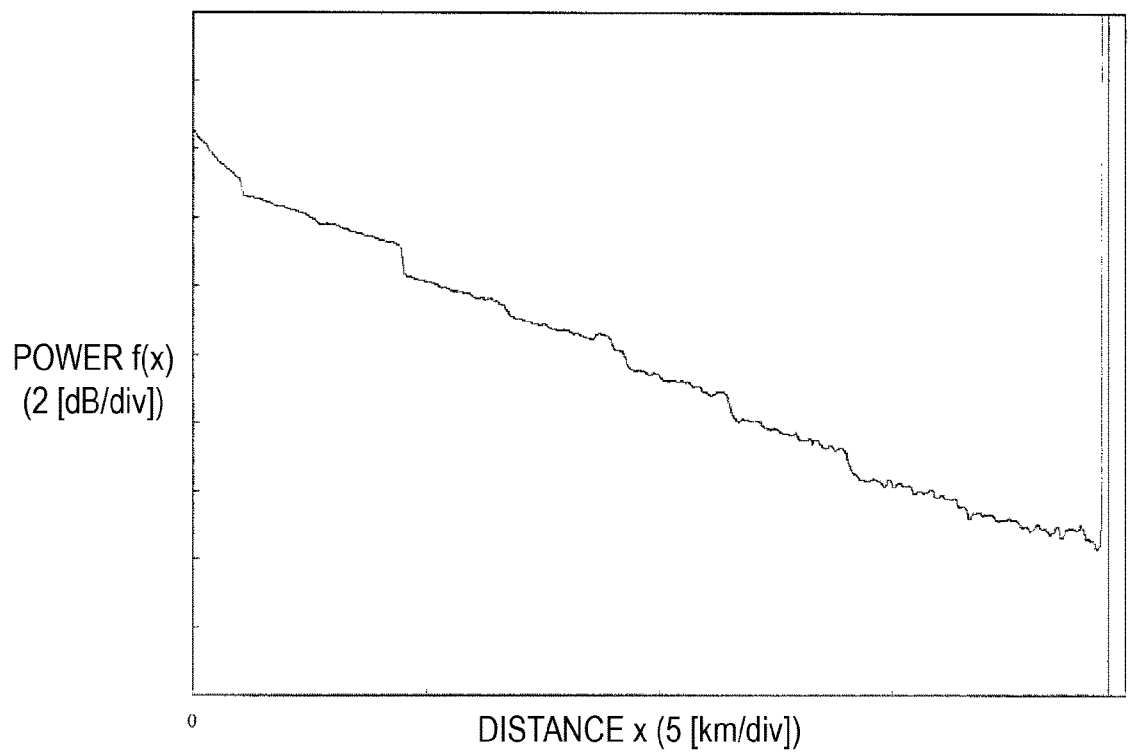
FIG. 2 is an OTDR waveform acquired by the optical fiber test apparatus according to the present invention.

FIG. 2 is an example of the light pulse test waveform (the OTDR waveform) measured by time-dividing the light intensity of the backscattered light acquired by the analysis unit 23 in step S1. A horizontal axis indicates a distance x (where one end of the optical fiber to be tested on which the light pulse is incident is x=0), and a vertical axis indicates an optical power f(x). As the distance x becomes far (on a distal end side), the optical power f(x) decreases due to transmission loss, connection loss, or the like of the optical fiber, and a noise is superimposed.

Figure 5:
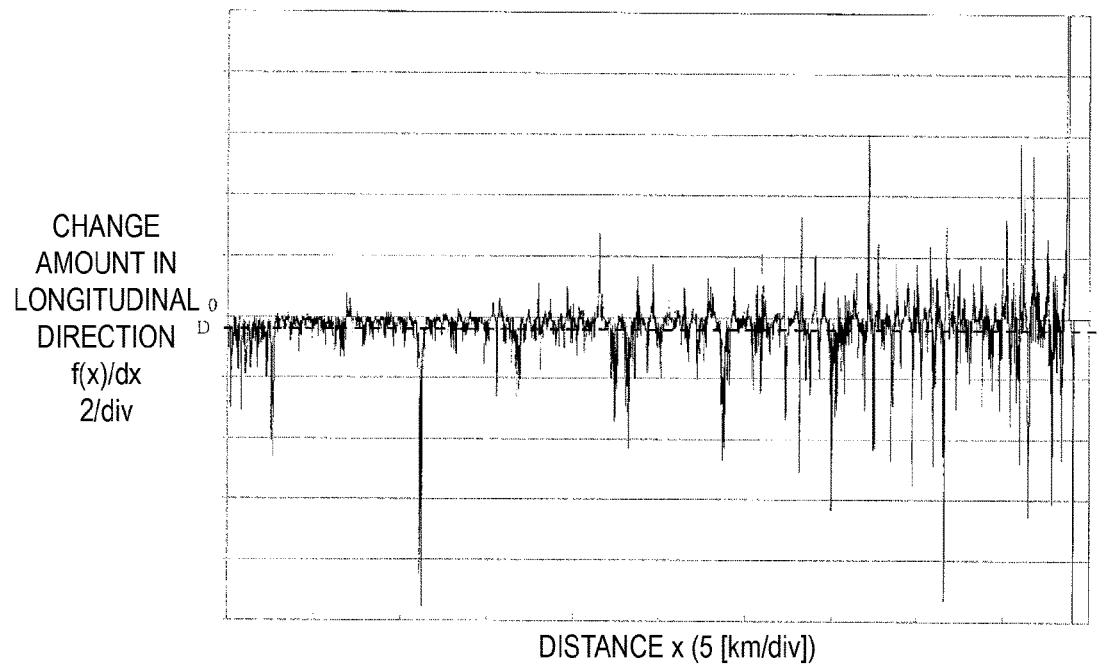
FIG. 5 is a change amount distribution diagram of an OTDR waveform calculated by the optical fiber test apparatus according to the present invention.

Examples of the method of calculating the change amount in the longitudinal direction in step S2 include a method of simply calculating a differential value f(x)/dx of the waveform at each point, and a method of calculating a slope of the waveform by linearly approximating an average value for each section. FIG. 5 is a distribution diagram of the value f(x)/dx obtained by differentiating the OTDR waveform. A noise increases as the distance from x=0 increases, and it is difficult to distinguish between the change at the connection point and the noise.

In step S3, first, a particular point is detected from the distribution of the change amount in the longitudinal direction as illustrated in FIG. 5. The particular point is, for example, the peak position of the OTDR waveform. To determine the peak position, a threshold D is set, and a point where the OTDR waveform is greater than the threshold D is determined to be the peak position. Considering the change due to transmission loss of the optical fiber line, for example, the threshold D is set to be the transmission loss −0.21 dB/km of the optical fiber at a wavelength of 1.55 μm.

Subsequently, in step S3, detection of the randomness of the OTDR waveform is performed. The randomness can be evaluated for the change amount in the longitudinal direction of the noise near each point of the optical fiber to be tested 1, for example, as a dispersion. To extract the change in the noise distribution at each point x, a dispersion value σ(x) of the data f(x) measured between x−1 to x is calculated. Considering that information on the scattered light measured by the pulse width w of the light pulse transmitted by the OTDR is integrated, for example, a value of l is set by $$l = w \times c / 2n.$$

Here c indicates a light speed in a vacuum, n indicates a refractive index of an optical fiber core, w=1 μs, c=3×10⁸ m/s, n=1.5, and l=100 m. In the OTDR waveform, l is ½ of w×c/n in order to convert the horizontal axis (distance) from a reciprocation time from input to return of the light pulse.

Figure 4:
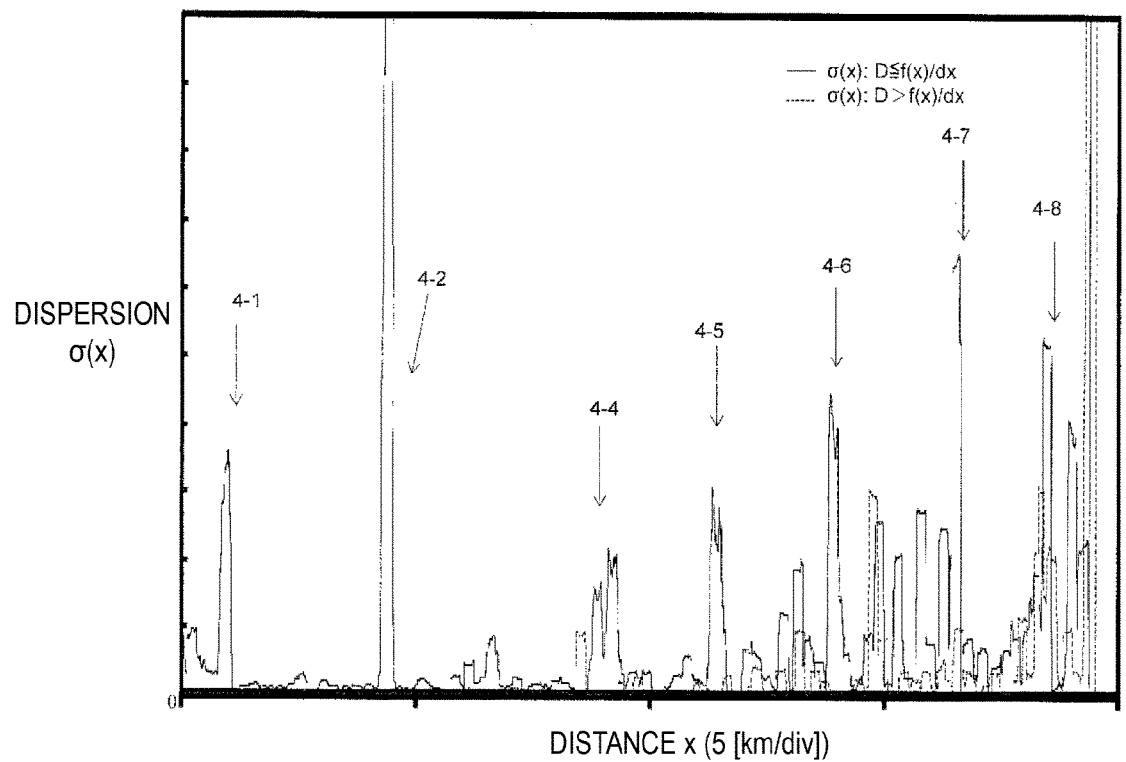
FIG. 4 is a randomness distribution diagram of an OTDR waveform calculated by the optical fiber test apparatus according to the present invention.

FIG. 4 is a diagram for explaining the distribution of the randomness 6. Solid lines indicate a dispersion value of the data between x−1 and x that is D≤f(x)/dx with a slope greater than the threshold D described above, and dotted lines indicate a dispersion value of the data between x−1 and x, which is D>f(x)/dx with a slope smaller than the threshold D. The dispersion value gradually increases as the distance increases as indicated by the broken lines and dotted lines because the dispersion increase due to noise, and the change amount is further integrated at the connection point. Compared to FIG. 5, the peak is clear in FIG. 4, for example, at 4-1 to 4-8.

In step S4, the change amount in the longitudinal direction and the randomness immediately before the point of each peak position are compared. For example, the comparison is performed by converting the randomness into √σ(x)+b. Here, b indicates an average value between x−1 and x.

As a result of the comparison in step S4, when the change amount in the longitudinal direction is larger, the peak position is determined to be the section boundary (connection point 3) (step S5), and when the randomness value is larger, it is determined that the peak position is due to noise and is not the section boundary (connection point 3) (step S6).

Effects of the Invention

When identifying a boundary point of a facility in automated analysis of the optical line characteristics, the OTDR 2 determines a boundary point from the OTDR waveform regardless of a constant threshold. The OTDR 2 determines a farther boundary point even when a large amount of noise is superimposed at the distal end of the optical line.

Second Embodiment

The analysis unit 23 is operated by a computer and a program, and the program is recorded on a recording medium or provided through a network.

Figure 6:
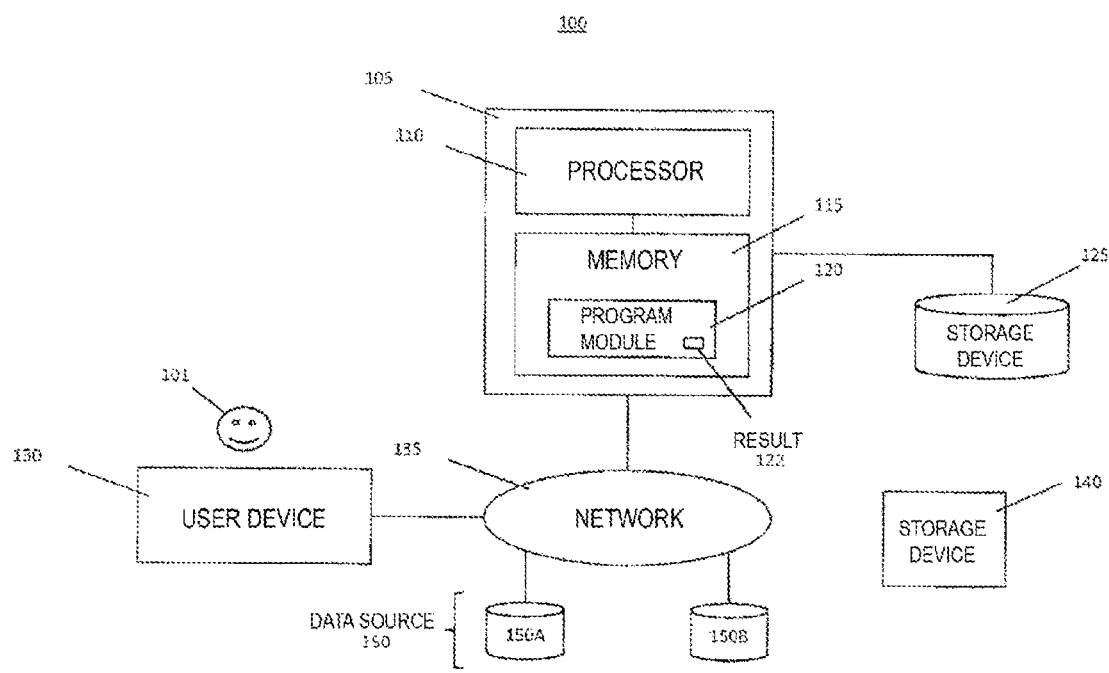
FIG. 6 is a diagram for explaining the optical fiber test apparatus according to the present invention.

FIG. 6 is a block diagram of a system 100. The system 100 includes a computer 105 connected to a network 135.

The network 135 is a data communication network. The network 135 may be a private network or a public network and can include any one or all of:
(a) a personal area network covering, for example, a room;
(b) a local area network covering, for example, a building;
(c) a campus area network covering, for example, a campus;
(d) a metropolitan area network covering, for example, a city;
(e) a wide area network covering, for example, areas that connect across boundaries of an urban area, a rural area, or a nation; and
(f) Internet. The communication is performed by electronic signals and optical signals via the network 135.

The computer 105 includes a processor 110 and a memory 115 connected to the processor 110. Although the computer 105 is represented herein as a standalone device, it is not limited, and the computer 105 can be connected to other devices not illustrated in a distributed processing system.

The processor 110 is an electronic device including logic circuit that responds to and executes instructions.

The memory 115 is a storage medium readable to a tangible computer with a computer program encoded therein. In this regard, the memory 115 stores data and instructions, that is program code, readable and executable by the processor 110 to control operation of the processor 110. The memory 115 can be implemented in a random access memory (RAM), a hard drive, a read-only memory (ROM), or a combination thereof. One of components of the memory 115 is a program module 120.

The program module 120 includes instructions for controlling the processor 110 to execute the processes described herein. Although operations are described herein as being performed by the computer 105 or a method or a process or a sub-process thereof, the operations are actually performed by the processor 110.

The term "module" is used herein to refer to a functional operation that can be embodied as either a stand-alone component or an integrated configuration of a plurality of lower components. Therefore, the program module 120 may be achieved as a single module or as a plurality of modules that operate in cooperation with each other. Moreover, while the program module 120 is described herein as being installed in the memory 115 and thus implemented in software, it is also possible to be implemented in any of hardware (for example, electronic circuit), firmware, software, or a combination thereof.

Although the program module 120 is illustrated as already being loaded into the memory 115, it may be configured to be located on a storage device 140 so as to be later loaded into the memory 115. The storage device 140 is a storage medium readable to a tangible computer storing the program module 120. Examples of the storage device 140 include a compact disc, a magnetic tape, a read-only memory, an optical storage media, a memory unit composed of a hard drive or a plurality of parallel hard drives, and a universal serial bus (USB) flash drive. Alternatively, the storage device 140 may be a random access memory or another type of electronic storage device that is located in a remote storage system not illustrated, and is connected to the computer 105 via the network 135.

The system 100 further includes a data source 150A and a data source 150B collectively referred to as a data source 150 herein and communicatively connected to the network 135. In practice, the data source 150 can include any number of data sources, that is, one or more data sources. The data source 150 can include unstructured data and include social media.

The system 100 further includes a user device 130 operated by a user 101 and connected to the computer 105 via the network 135. The user device 130 includes an input device, such as a keyboard or speech recognition subsystem, for enabling the user 101 to transmit information and a command selection to the processor 110. The user device 130 further includes an output device, such as a display device or a printer or an audio synthesizer. A cursor control unit, such as a mouse, a trackball, or a touch sensitive screen, allows the user 101 to manipulate a cursor on the display device to transmit additional information and a selection of command to the processor 110.

The processor 110 outputs an execution result 122 of the program module 120 to the user device 130. Alternatively, the processor 110 can provide output to a storage device 125, for example a database or a memory, or can provide output to a remote device not illustrated via the network 135.

For example, a program that executes the flowchart of FIG. 3 may be the program module 120. The system 100 can be operated as the analysis unit 23.

The terms "includes" or "including" specifies that features, integers, steps, or components described therein are present, but should be interpreted that they do not exclude the presence of one or more other features, integers, steps, or components, or groups thereof. The terms "a" and "an" are indefinite articles and therefore do not exclude embodiments having a plurality thereof.

Other Embodiments

Note that the present invention is not limited to the above-described embodiments, and can be variously modified and implemented within the scope not departing from the gist of the present invention. In short, the present invention is not limited to the higher-level embodiment as it is, and can be embodied, at the implementation stage, with the components modified within the scope not departing from the gist thereof. For example, in the examples described above, the fiber in which three optical fibers are connected in series has been described as an optical fiber to be tested, but the test can be performed using a fiber in which four or more optical fibers are connected in series as an optical fiber to be tested. In addition, the optical fiber can be tested not only in series, but also in an optical fiber line branched off by connecting a light splitter or the like to the optical fiber.

Various inventions can be formed by appropriate combinations of a plurality of components disclosed in the above-described embodiments. For example, several components may be deleted from all of the components illustrated in the embodiments. Furthermore, components of different embodiments may be appropriately combined with each other.

REFERENCE SIGNS LIST

1: Optical fiber to be tested
2: Optical fiber test apparatus (OTDR)
3: Fusion point
21: Light incidence part
22: Light reception part
23: Analysis unit
24: Display unit
100: System
101: User
105: Computer
110: Processor
115: Memory
120: Program module
122: Result
125: Storage device
130: User device
135: Network
140: Storage device
150: Data source

The invention claimed is:

1. An optical fiber test method comprising:
causing a light pulse to be emitted to one end of an optical fiber to be tested;
receiving backscattered light generated by the light pulse;
acquiring a light pulse test waveform of a light intensity of the backscattered light relative to a distance from the one end of the optical fiber to be tested;
calculating a value of a change amount and a randomness value of the light pulse test waveform at a plurality of points, in a longitudinal direction, of the optical fiber to be tested;
comparing the change amount and the randomness value at a plurality of particular points among the plurality of points; and
determining, among the plurality of particular points, a point where the change amount is larger than the randomness value to be a boundary point present in the optical fiber to be tested.

2. The optical fiber test method according to claim 1, wherein, among the plurality of points, a point where the change amount is greater than a predetermined threshold is defined as a particular point in the plurality of particular points.

3. The optical fiber test method according to claim 1, wherein the randomness is a dispersion of the light pulse test waveform in a section I from a particular point in the plurality of particular points to the one end side, and
the section I is a value obtained by dividing, to obtain ½, a product of a speed of light c in a vacuum and a width w of the light pulse by a refractive index n of a core of the optical fiber to be tested.

4. An optical fiber test apparatus, comprising:
a light incidence part configured to emit a light pulse to one end of an optical fiber to be tested;
a light reception part configured to receive backscattered light generated by the light pulse; and
an analysis unit configured to
acquire a light pulse test waveform of a light intensity of the backscattered light relative to a distance from the one end of the optical fiber to be tested,
calculate a value of a change amount and a randomness value of the light pulse test waveform at a plurality of points, in a longitudinal direction, of the optical fiber to be tested,
compares the change amount and the randomness value at a plurality of particular points among the plurality of points, and
determines, among the plurality of particular points, a point where the change amount is larger than the randomness value to be a boundary point present in the optical fiber to be tested.

5. The optical fiber test apparatus according to claim 4, wherein the analysis unit defines a point among the plurality of points where the change amount is greater than a predetermined threshold as a particular point in the plurality of particular points.

6. The optical fiber test apparatus according to claim 4, wherein the analysis unit determines the dispersion of the light pulse test waveform in a section I from a particular point to the one end side as the randomness, and the section I is a value obtained by dividing, to obtain ½, a product of a speed of light c in a vacuum and a width w of the light pulse by a refractive index n of a core of the optical fiber to be tested.

7. A non-transitory computer-readable medium having computer-executable instructions that, upon execution of the instructions by a processor of a computer, cause the computer to function as the analysis unit of the optical fiber test apparatus according to claim 4.

* * * * *